H. M. & S. P. ROCKWELL.
HARDNESS TESTER.
APPLICATION FILED JULY 15, 1914.
1,294,171.
Patented Feb. 11, 1919.
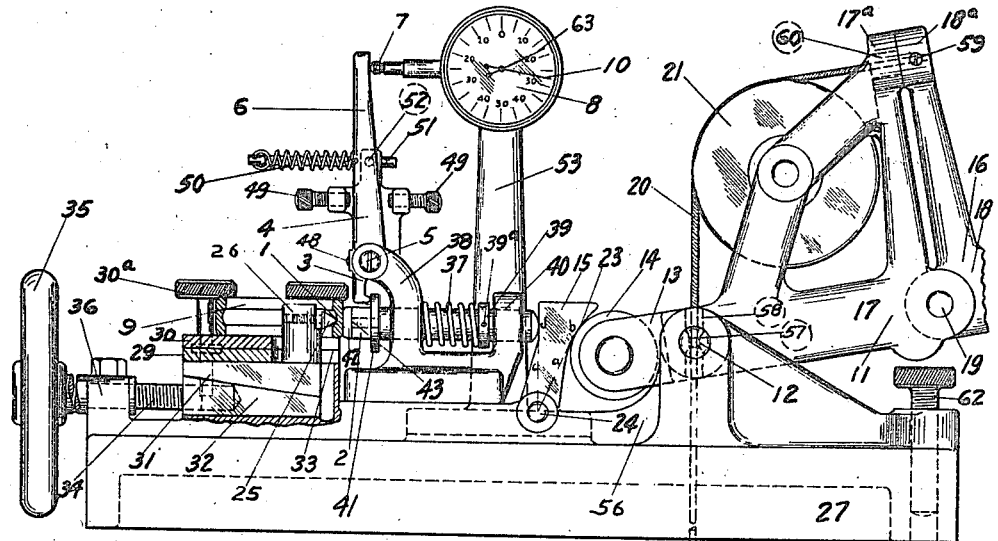
Fig. 1
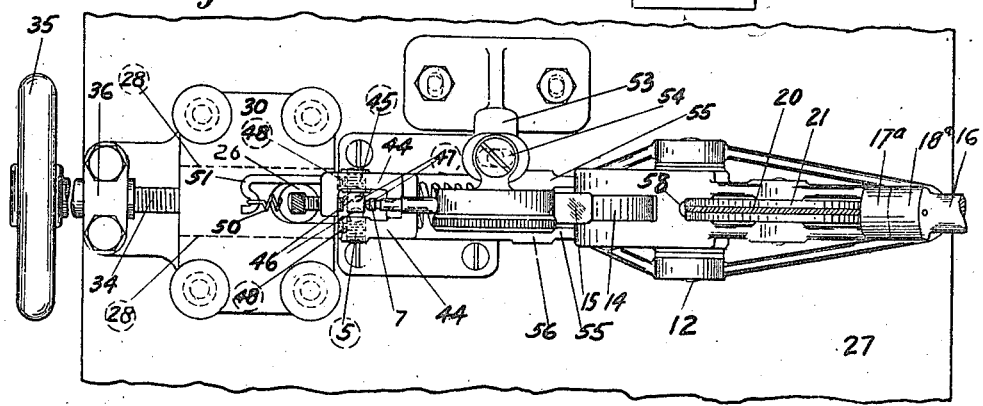
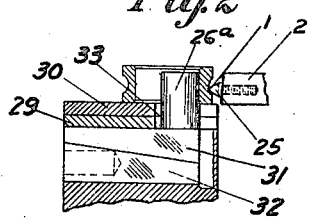
Fig. 2
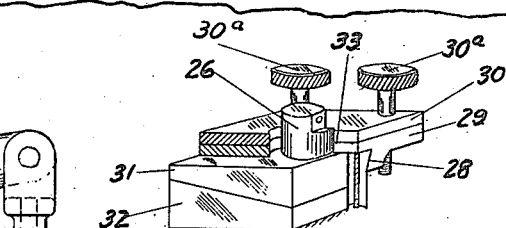
Fig. 3
Fig. 4
Fig. 5
WITNESSES:
Charles S. Joy
Harold A. Kingsbury.
INVENTORS
Hugh M. Rockwell,
Stanley P. Rockwell,
BY
their ATTORNEY

UNITED STATES PATENT OFFICE.

HUGH M. ROCKWELL AND STANLEY P. ROCKWELL, OF BRISTOL, CONNECTICUT.

HARDNESS-TESTER.

1,294,171.                    Specification of Letters Patent.      Patented Feb. 11, 1919.

Application filed July 15, 1914.   Serial No. 851,106.

*To all whom it may concern:*

Be it known that we, HUGH M. ROCKWELL and STANLEY P. ROCKWELL, citizens of the United States, residing at Bristol, county of Hartford, State of Connecticut, have invented a certain new and useful Hardness-Tester, of which the following is a full, clear, and exact description, such as will enable others skilled in the art to which it appertains to make and use the same, reference being had to the accompanying drawings, forming part of this specification.

Our invention relates to testing machines, and more particularly to hardness testers.

In the manufacture of the cups and cones of antifriction bearings, it is highly desirable to test the hardness of the cups and cones and especially the hardness of their curved raceways. Previous hardness testers, when attempts have been made to apply them to this kind of testing, have been found open to various objections. For example, machines which require that the test be made upon a flat surface are not applicable to the testing of the curved raceways, and even such machines are, when of a type to give tests of sufficient accuracy on the flat surfaces to which they are restricted, too complicated and require too great manipulative skill to be used successfully by the ordinary shop workman, and also are too slow in operation to be used in testing large numbers of articles in the time which can, commercially, be devoted to such testing, while devices, as a file, which can be used for curved surface testing are not sufficiently accurate. We have devised a hardness tester which can be used by the ordinary workman to rapidly and accurately test the hardness not only of flat surfaces but also of raceways and other curved surfaced bodies.

One object of our invention is to provide a hardness tester which can be used in testing curved surfaced bodies at and below the curved surface.

Another object is to provide a tester which can be used in testing flat surfaced bodies.

Another object is to provide a tester which can be successfully used by the ordinary shop workman.

Another object is to provide a device of the character above indicated which can be rapidly operated, is simple in construction, can be inexpensively manufactured, and will give accurate results.

To these ends and also to improve generally upon devices of the character indicated, our invention consists in the various matters hereinafter described and claimed.

In the accompanying drawings:

Figure 1 is a side elevation of a hardness tester embodying our invention, certain parts being broken away to economize space;

Fig. 2 is a plan view of the tester illustrated in Fig. 1, certain parts of the base being broken away to economize space;

Fig. 3 is a detail view showing the mounting of the penetrator when the device is to be used for testing the raceways of cones;

Fig. 4 is a fragmental view of the operating lever and an actuating means therefor; and Fig. 5 is a fragmental perspective view showing the clamping mechanism for holding the resistance abutment and the table block in position.

Without restricting our invention thereto, we show and describe a device more particularly adapted for the testing of the hardness of steel cups and cones.

The illustrated tester comprises a testing device shown as a penetrator or point 1, fixed against movement, and a force applying element or plunger 2, mounted for movement to and from the point 1. The plunger 2 is operatively connected with the short arm 3 of a lever, designated generally as 4, to move the lever. The lever 4 is fulcrumed at 5 and has its long arm 6 in contact with the plunger 7 of the dial indicator 8. As is common in dial indicators, the plunger 7 is always urged toward its outermost position by suitable mechanism within the instrument.

With the construction thus far described, it will be seen that if pressure be applied to the plunger 2 such plunger will force an article, as the cup 9, against the point 1 and, as the point 1 penetrates the cup, the extent of movement will be indicated by the pointer 10.

A lever, designated generally as 11, is fulcrumed at 12 and has its short arm 13 (which for antifrictional purposes may include a roller 14) so operatively connected with the plunger 2, by the cam block 15 hereinafter more fully referred to, that a load of a given amount (say pounds × inches) applied to the long arm 16 of the lever 11, in the various angular positions of the lever, will always result in the same longitudinal pressure being applied to the plunger 2.

The long arm 16 of the lever 11 is composed of two L-shaped sections 17 and 18, respectively, hinged together by the pin 19. A load applying device is connected to the stem or abutment 18ª of the section 18. This device preferably comprises a line or wire 20 which passes loosely through the stem or abutment 17ª of the section 17, over a pulley 21 (carried by and with the section 17), loosely through the fulcrum point 12 of the lever 11, and is loaded with a hanging weight 22. This load applying device holds, within limits, the stem or abutment 18ª in fixed relation with respect to the coöperating abutment 17ª and so maintains the lever arm rigid at the hinge.

With the construction just above described, it will be seen that, if a load be applied to the long arm 16 which load is, by the slightest amount, greater than the pull of the weight 22, the section 18 will hinge about the point 19 and only the load determined by the pull of the weight will be effectively applied. Thus no load greater than the pull of the weight 22 can be effectively exerted on the long arm of the lever. In consequence, no force greater than a predetermined one can be exerted by the lever on the plunger. We find this construction very desirable, as, with it, it will be seen that it is only necessary to instruct the workman, to, in a test, apply sufficient power to buckle the lever at the hinge. If he follows these instructions it is clear that he will always apply a fixed force or load to the plunger.

In use, the article to be tested, as the cup 9, is placed in position and the plunger brought easily against it to firmly center it and the initial reading of the pointer 10 taken, as by turning the dial to bring the zero of the scale beneath the pointer. Pressure is then applied to the lever 11 until it buckles at the hinge 19. Pressure on the lever is then relieved and the lever brought to such a position as to merely firmly bring the plunger against the work to thereby merely firmly but fully seat the penetrator in the depression just made, and the final reading of the pointer 10 taken.

Clearly the difference between the initial and the final reading gives the "permanent set" depth of the depression made by the penetrator and this depth gives a definite indication as to the hardness of the test piece,—the less the depth the harder the piece.

While, if desired, the total penetration of the penetrator could, of course, be read from the dial we prefer the method of taking the "permanent set" reading. This is because the total inward movement is composed of two factors, to wit: the inward movement due to the elasticity of the material being tested and the inward movement due to the permanent giving way of the material. The maximum reading of the pointer gives, of course, the total inward movement due to elasticity plus that due to "permanent set", while the final reading gives the inward movement due to "permanent set" alone. We consider the "permanent set" the more accurate indication of hardness. Evidently the difference between the maximum and the final reading gives an indication of the elasticity.

It will be seen that by the use of a penetrator, as 1, which is forced into the material being tested, and of a means for measuring the depths of penetration, the tests are not confined to test pieces having flat surfaces, but that test pieces having arcuate surfaces, such as the surface of the raceway of a cup or cone, can be properly tested at and below the curved surface.

It will also be seen that, with an indicator, as for example the dial indicator 8, connected for actuation during the operation of the machine, the results of the tests can be quickly and directly read off by the operator. Thus he is not under the necessity, such as arises even in the use of certain flat surface testers, of removing the test piece from the machine and manually measuring the desired dimension which gives an indication as to hardness. And it will be understood that the various mechanisms, such, for example, as that for insuring the application of a fixed maximum load, are by no means restricted to use with indicating devices giving the depth of penetration as they might also be combined with indicating means giving any suitable dimension of a depression.

It will also be seen that by the use of an automatic safety device, illustrated by way of example as the hinge 19, weight 22, etc., we provide that the device can be properly used by an unskilled operator.

The operative connection, or transmitting and compensating means, between the lever 11 and the plunger 2, for insuring that a load of a given amount applied to the lever, in the various angular positions of the lever, will always result in the same longitudinal pressure on the plunger, may be of any suitable character. Preferably, and as here shown, it comprises the before referred to compensator or pivoted cam block 15. The cam block 15 has a portion in contact with the end of the plunger 2 and a cam surface 23 in contact with the lever. The cam surface 23 is, as illustrated, of such a character that, assuming any given load applied to the lever, the moment arm as $a$, from the fulcrum 24 to the point of contact, as $b$, of the end of the lever with the cam surface so varies in length, as the lever 11 is moved, as to compensate for any changes in the size of the resultant force applied by the lever at right angles to the arm $a$ and under the given load; to compensate for any changes in the length of the moment arm, as *c*, from the fulcrum 24 to the contact point as *d*, of the plunger with the cam block, and also to compensate for any changes in the angle which the force acting parallel with the axis of the plunger makes with the moment arm, as *c*. Although the illustrated cam surface compensates for all these variations, it will be understood that it might be designed to compensate for any suitable number of them, and to perform such compensation more or less accurately, depending upon the accuracy of results desired in the tests for which the device is to be used.

Although in the present instance the portion of the lever in contact with the cam surface is shown as a roller, it will be understood that such portion of the lever may be of any suitable character.

The penetrator may conveniently and preferably be a diamond 1 which may be carried in a holder 25 screwed into the resistance abutment 26.

When it is desired to test a cone, which, of course, has its raceway ground upon its outer periphery rather than its inner periphery as is the case in a cup, we may conveniently reverse the position of the point 1. That is to say, we may, as illustrated for example in Fig. 3, place the point in the end of the plunger 2, preferably at the same time using a resistance abutment 26ª with a curved outer circumference to abut the inner periphery of the cone.

The work, as the cup 9, may be properly located in the machine in any suitable manner. As here illustrated, the base 27 is provided with parallel guides or supports 28, 28, which carry a table block, as 29. The block is shown, more particularly in Fig. 5, as slidably connected with the guides by a tongue-and-groove-joint, preferably a dovetail joint. To provide for different heights (as the articles lie in a horizontal tester) of cups and cones, for example, we may, of course, use table blocks of different thicknesses, each table block being of a suitable thickness to support a respective piece of work in proper relation to the penetrator and plunger. The table block 29 is shown as removable from the guideways in order to provide for the substitution of a block of different thickness. In the case of a race member, for example, a table block may desirably be of a thickness to bring the center line of a raceway substantially in line with the penetrator.

Conveniently, we may provide a table block, as 29, with a supplementary table plate 30 vertically adjustable with respect to the table block proper. This vertical adjustment may be accomplished by adjusting screws 30ª carried by the plate and rotatable but non-longitudinally shiftable with respect thereto, and threaded into the block. With this construction we can obtain certain variations of height in the table block without the necessity of such a large number of blocks of various thicknesses, as might otherwise be necessary.

In order to provide for the insertion of pieces of various thicknesses (longitudinally of the instrument) the abutment 26 may be rigidly mounted upon a longitudinally shiftable upper wedge block 31 resting upon a lower wedge block 32. Both wedge blocks are received between the guides 28, 28, and below the table block 29 and the table block is provided with an aperture 33 for the loose passage of the resistance abutment 26.

A screw 34, conveniently carrying a hand wheel 35 fixed thereon, is rotatably carried in the journal 36 but is held against longitudinal movement with respect thereto as shown. The screw 34 is screw-threaded into the lower wedge block 32. With this construction the wedge blocks may be manually so placed as to properly locate the abutment 26 and then the screw may be turned to force the inclined planes intimately into contact with each other thereby forcing the upper wedge block against the lower side of the table block 29 and jamming the dovetail joint connection, the block 29 serving as a resistance piece for the block 31. Thus the resistance abutment and the table block are locked in fixed position both with respect to each other and to the frame of the machine.

It will be understood, of course, that, although the above means are provided whereby the abutment may be placed in various positions and large and small variations in thickness provided for, small variations may be provided for merely by placing the plunger in various initial positions with respect to the abutment. This is because, due to the compensating means, the angle at which the lever 11 stands makes no difference in the amount of the force which will be applied to the plunger.

Preferably the plunger 2 is surrounded by a spring 37 under compression and abutting, at one end, the support 38 and, at the other end, an adjustable collar 39 fixed in adjusted position on the plunger 2 by the set screw 39ª. This spring acts to overcome any backlash in the mechanism and to automatically withdraw the plunger from the test piece when the plunger is relieved from pressure. It will be understood, of course, that the spring is of such a character and the range of movement of the plunger so small, comparatively, that whatever changes there might be in the force exerted by the spring in the various positions of the plunger would be so small as to be entirely negligible.

The plunger 2 is shown as conveniently mounted in the support 38 and in a support 40 for longitudinal travel therein. In order to connect the plunger with the short arm 3 of the lever 4, the plunger is shown as provided with a collar 41 which abuts such arm. The end of the plunger may be provided with a tip 42 detachably connected to the plunger proper, as indicated at 43, so as to be replaced by the holder 25 of the penetrator 1 when it is desired to test cones for example.

As illustrated, the lever 4 is fulcrumed between the arms 44, 44, of the support 38 by means of the socketed adjusting screws 5, 45, respectively, carrying balls 46, 46, resting in sockets 47, 47, in the lever 4, the screws being held in adjusted position by the set screws 48, 48. If desired an arm 44 may carry stop screws 49, 49, for the lever 4. A spring, as 50, for maintaining the short arm of the lever in contact with the collar 41 may be provided. Such spring is shown as carried by the rod 51 adjustably mounted in the support 38 and held in adjusted position by the set screw 52.

The indicating means here, by way of example, illustrated as the dial indicator 8 may be of any suitable character and may be supported in any suitable manner. As illustrated the indicator 8 is carried by a support 53 bolted to the base 27 and carrying the indicator adjustably connected to its upper end as indicated generally at 54.

The pivot pin 24 of the cam block 15 is shown as mounted between the sides 55 of the support 56. The lever 11 is shown as also fulcrumed, by the pin 12, between these same sides, such pin being preferably fitted to move with the lever and having an aperture 57 therein for the passage of the before referred to wire 20. The aperture 57 is, as illustrated, of sufficient cross-section and such contour as to obviate objectionable binding of the wire. The lever is shown as provided with a corresponding aperture 58 for the passage of the wire.

Preferably the wire 20 is connected to the stem of the section 18 by the set screw 59 and passes loosely through an aperture 60 in the stem 17ª.

A link, as 61 (see Fig. 4), or any other suitable connection, may if desired be provided for connecting the lever with a foot-treadle or other suitable device (not shown) for applying power to the lever, should it for any reason be desired to not use mere manual operation. An adjustable abutment for the lever 11, as the screw 62 may be provided.

A second indicator pointer 63 adapted to be manually set in various positions with respect to the primary pointer 10 and then to move therewith may be provided. This pointer 63 may be set a distance behind the pointer 10 equal to the number of units representing the greatest softness permissible in the test piece. Evidently with this arrangement if, when the final reading is taken, the pointer 63 stands behind the initial point, as zero, of the pointer 10, it is evident that the test piece falls within the desired limit of hardness.

In the use of the machine for testing cups and cones we have found it desirable to measure the depressions made by the point 1 in thousandths of an inch, the actual distances being multiplied by the five-to-one lever 4, whereby five graduations of the dial indicator represent one one-thousandth of an inch depression, the indicator being a thousandths indicator. We have also found it desirable to use such a weight 22 (as seventy-five pounds) and such a ratio between the lengths of the stem 18ª and the short arm of the lever 11, as measured from the fulcrum 12 to the contact point $b$ of the roller (as 4:2) that the pressure exerted by the lever at the cam block shall be about one hundred and fifty pounds.

In raceway testing we prefer to apply the tests just before the final grinding operation as by so doing the permanent depressions are made in the "grinding allowance" only so that, after final grinding, the raceways are left unscarred. Moreover, by applying the tests at this point in the operations, pieces that are too soft are discovered then and the useless expense of final grinding obviated.

Since the depths of penetration can be indicated by the tester it will be seen that it is applicable to the testing of pieces at considerable distances below their surfaces as, clearly, a depression of sufficient diameter to receive the penetrator may first be made in the piece and the tests made upon the material at the bottom of such depression.

It will be seen that we have provided a tester which not only is applicable to the testing of pieces having flat surfaces but is also applicable to the testing of pieces having curved surfaces at and below the curved surfaces, which can be quickly operated and gives accurate results which is simple in construction and comparatively inexpensive to manufacture, and yet is so simple in operation that it may be put into the hands of, and operated successfully by, any unskilled operator as, for example, the ordinary shop workman.

Having thus described our invention, what we claim is:

1. In a device of the character indicated, the combination with a penetrator with means including a jointed lever for causing the penetration of the test piece by the penetrator, and with means opposing the flexing of said lever at said joint with a predetermined constant force, of means automatically controlled by the movement of the penetrator for indicating the depth of the depression made by the penetrator; substantially as described.

2. In a device of the character indicated, the combination with a penetrator with means including a jointed lever for causing the penetration of the test piece by the penetrator, and with means opposing the flexing of said lever at said joint with a predetermined constant force, of a device for indicating the depth of the depression made by the penetrator, and means operatively connecting said device and said first named means; substantially as described.

3. In a device of the character indicated, in combination, a penetrator, force applying mechanism including a jointed lever, the joint of which is adapted to yield under the application of a predetermined force, for causing the penetration of the test piece by the penetrator, and means for indicating the depth of the depression made by the penetrator, such force applying mechanism including means whereby the maximum force applied thereby is constant; substantially as described.

4. In a device of the character indicated, in combination, a testing device, force applying mechanism including a jointed lever, the joint of which is adapted to yield under the application of a predetermined force, for causing the device to operate upon the test piece, such mechanism including a lever to which force is applied, and a compensating means receiving and transmitting force from the lever and whereby the ratio between the force effectively applied to the lever and that operatively transmitted is maintained constant in the various angular positions of the lever; substantially as described.

5. In a device of the character indicated, in combination, a testing device and force applying mechanism for causing the device to operate upon the test piece; such mechanism including a lever to which force is applied and a fulcrumed cam-surfaced element for receiving and transmitting force from said lever, said element having its cam-surface in connection with said lever and such cam-surface being of a contour such that the moment arms extending from the fulcrum of said element to the respective points of connection of said cam-surface with said lever so vary in length as to compensate for the changes in angular position of the lever; substantially as described.

6. In a device of the character indicated, in combination, a testing device, force applying mechanism including a jointed lever, the joint of which is adapted to yield under the application of predetermined force, for causing the device to operate upon the test piece, such mechanism including a lever to which force is applied, and means whereby said lever is incapable of applying a force in excess of a predetermined amount; substantially as described.

7. In a device of the character indicated, in combination, a testing device and force applying mechanism for causing the device to operate upon the test piece; such mechanism including a lever to which force is applied and one of whose arms comprises two sections hinged together, and such mechanism also including means for normally holding said sections rigid and unyielding with respect to each other, said means being yieldable so as to fail and permit appreciable movement of that section of the arm to which force is applied and under a constant load in excess of a predetermined amount; substantially as described.

8. In a device of the character indicated, in combination, a testing device and force applying mechanism for causing the device to operate upon the test piece; such mechanism including a lever to which force is applied and one of whose arms comprises two sections hinged together and carrying coöperating abutments, and such mechanism also including a load applying device connected to one of said sections and acting to force said abutments against each other to thereby prevent within limits determined by said load the buckling of said arm at said hinge; substantially as described.

9. In a device of the character indicated, in combination, a testing device and force applying mechanism for causing the device to operate upon the test piece; such mechanism including a lever to which force is applied and one of whose arms comprises two sections hinged together and carrying coöperating abutments, a pulley carried by one of said sections, a line attached to the other of said sections at a distance from said hinge and passing over said pulley and through the fulcrum of said lever, and a load element connected to said line, whereby said load acts to force said abutments together and prevent relative movement of said sections at the hinge; substantially as described.

10. In a device of the character indicated, in combination, a testing device and force applying mechanism for causing the device to operate upon the test piece; such mechanism including a lever to which force is applied and a compensating means receiving and transmitting force from the lever and whereby the ratio between the force applied to the lever and that operatively transmitted is maintained constant in the various angular positions of the lever, and such mechanism also including means whereby said lever is incapable of applying a force in excess of a predetermined amount; substantially as described.

11. In a device of the character indicated, the combination with a penetrator, a traveling plunger for causing the penetration of the test piece by the penetrator, and an indicator, of a lever fulcrumed adjacent said plunger and having an arm operatively connected therewith to be actuated thereby during travel of the plunger and also having an arm operatively connected with said indicator to operate the latter to indicate the amount of movement of the plunger, and means connected with said plunger to govern the amount of force applied thereto.

12. In a device of the character indicated, the combination with an abutment for the test piece and a force applier adjacent thereto, said abutment being shiftable to vary its distance from the force applier to permit the insertion of test pieces of different sizes between them, of means for locking the abutment in fixed position; such means comprising a block carrying the abutment, a resistance piece adjacent said block, and means for fixing the position of the resistance piece and for jamming said block into fixed contact with said resistance piece; substantially as described.

13. In a device of the character indicated, the combination with a base, a testing device for the test piece, and a table for supporting the piece in testing relation to the testing device, such table being removable from the base, of means for fixing the table upon the base; such means comprising a support fixed to the base and having a tongue-and-groove-joint connection with the table, and means for wedging said connection; substantially as described.

14. In a device of the character indicated, the combination with a base, an abutment for the test piece, a force applier adjacent thereto, a testing device, and a table for supporting the piece in testing relation to the testing device, the force applier and the abutment, said abutment being shiftable to vary its distance from the force applier to permit the insertion of test pieces of different sizes between them, and said table being removable from the base, of means for locking the abutment in fixed position and for fixing the table upon the base; such means comprising a support fixed to the base and having a tongue-and-groove-joint connection with the table, a block adjacent said table and carrying said abutment, and means for wedging said block in fixed contact with said table to thereby relatively fix the table and block and to wedge said connection to relatively fix said table and support; substantially as described.

15. In a device of the character indicated, in combination, a testing device and a table for supporting the test piece in testing relation to said device; said table comprising a block, a table plate, adjusting screws connecting said block and plate whereby adjustment of said screws varies the effective height of said table; and wedge shaped blocks underlying the table plate to support it and prevent movement thereof after adjustment.

16. In a device of the character indicated, in combination, a penetrator, an abutment for the test piece, a plunger for causing the penetrator to penetrate the piece during such plunger's movement, said penetrator being carried by one of said other elements, an indicator, a lever fulcrumed adjacent said plunger and having an arm in connection with said plunger to be actuated thereby during movement of said plunger and also having an arm in connection with said indicator whereby the extent of movement of said plunger is indicated by said indicator, a lever for applying force to said plunger to move it, mechanism in connection with said lever for predetermining the maximum load which can be effectively applied to said lever, and a fulcrumed compensating cam block disposed between said plunger and lever and having a portion in connection with said plunger and a cam surface in connection with said lever, the contour of said surface being such that the moment arms extending from the fulcrum of said block to the respective points of connection of the lever with said cam surface so vary in length as to compensate for changes in angular position of the lever; substantially as described.

17. In a device of the character indicated, the combination with a penetrator, a jointed lever adapted to yield at its joint upon the application of a predetermined force applied to said lever, an operative connection between the penetrator and lever to transmit said predetermined force to said lever, a register to show the degree of penetration, and an operative connection between the penetrator and register.

18. In a device of the character indicated, the combination with a penetrator, of a jointed lever adapted to yield at its joint, a governor to determine the amount of force to cause said joint to yield, and an operative connection between the penetrator and lever to transmit only said predetermined force to the penetrator irrespective of the amount of force initially applied to said lever.

19. In a device of the character indicated, the combination with a penetrator, of a two part pivotally mounted lever operatively connected with the penetrator, there being a pivoted joint between the parts separate from the pivotal mount of said lever, and means for yieldingly connecting the two parts of said lever to permit the joint to "break" and continue such breaking movement under the application of a constant predetermined force.

20. In a device of the character indicated, the combination with a penetrator, of one section of a jointed lever, a pivot for said section, a connection between said section and penetrator on one side of said pivot, a second section of said lever pivotally connected with the first section on the opposite side of said pivot, and means for yieldingly connecting the two sections of the lever to permit the joint to "break" and continue such breaking movement under the application of a constant predetermined force.

In testimony whereof, we hereunto affix our signatures in the presence of two witnesses.

HUGH M. ROCKWELL.
STANLEY P. ROCKWELL.

Witnesses:
 WILLIAM E. WIGHTMAN,
 HAROLD A. KINGSBURY.